United States Patent
Chen et al.

(10) Patent No.: US 12,446,861 B2
(45) Date of Patent: Oct. 21, 2025

(54) METHODS AND SYSTEMS FOR CLINICAL SCORING A LUNG ULTRASOUND

(71) Applicant: KONINKLIJKE PHILIPS N.V., Eindhoven (NL)

(72) Inventors: Alvin Chen, Cambridge, MA (US); Jochen Kruecker, Andover, MA (US); Naveen Balaraju, Dorchester, MA (US); Shubham Patil, Cambridge, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/722,255

(22) PCT Filed: Dec. 19, 2022

(86) PCT No.: PCT/EP2022/086531
§ 371 (c)(1),
(2) Date: Jun. 20, 2024

(87) PCT Pub. No.: WO2023/117828
PCT Pub. Date: Jun. 29, 2023

(65) Prior Publication Data
US 2025/0152144 A1     May 15, 2025

Related U.S. Application Data

(60) Provisional application No. 63/293,232, filed on Dec. 23, 2021.

(30) Foreign Application Priority Data

Jan. 6, 2022    (EP) .................................... 22150471

(51) Int. Cl.
*A61B 8/00*    (2006.01)
*A61B 8/08*    (2006.01)
(Continued)

(52) U.S. Cl.
CPC .............. *A61B 8/5223* (2013.01); *A61B 8/08* (2013.01); *G06T 7/0012* (2013.01); *G16H 50/20* (2018.01);
(Continued)

(58) Field of Classification Search
CPC ....... A61B 8/5223; A61B 8/08; G06T 7/0012; G06T 2207/10132; G06T 2207/20081;
(Continued)

(56) References Cited

U.S. PATENT DOCUMENTS 9,211,110 B2 *  12/2015  Rubin .................... A61B 8/485
11,287,351 B2 *   3/2022  Zhuge .................... G06T 17/20
(Continued)

FOREIGN PATENT DOCUMENTS

CN     112950534 A     6/2021
WO    2023151911 A1    8/2023

OTHER PUBLICATIONS

International Search Report and Written Opinion for PCT/EP2022/086531; Mailing date: Mar. 23, 2023, 13 pages.
(Continued)

*Primary Examiner* — Sanjay Cattungal

(57) ABSTRACT

A method (100) for analyzing ultrasound image data, comprising: (i) receiving (120) ultrasound image data for a patient, comprising at least one lung-related clinical feature; (ii) selecting (130) a first clinical feature; (iii) analyzing (140), using an image processing algorithm, the ultrasound image data to extract one or more image parameters of the selected clinical feature, wherein the image processing algorithm is defined to analyze the selected clinical feature; (iv) analyzing (150), using a trained machine learning algorithm, the ultrasound image data to extract one or more learned parameters of the selected clinical feature, wherein the trained machine learning algorithm is trained to analyze the
(Continued)

selected clinical feature; (v) combining (160) the image parameters and the learned parameters to generate a final lung-related clinical feature analysis; and (vi) providing (170) the generated final lung-related clinical feature analysis.

15 Claims, 11 Drawing Sheets

(51) Int. Cl.
  *G06T 7/00* (2017.01)
  *G16H 50/20* (2018.01)

(52) U.S. Cl.
  CPC .............. *G06T 2207/10132* (2013.01); *G06T 2207/20081* (2013.01); *G06T 2207/30061* (2013.01)

(58) Field of Classification Search
  CPC .......... G06T 2207/30061; G16H 50/20; G16H 50/30; G16H 30/40
  See application file for complete search history.

(56) References Cited

U.S. PATENT DOCUMENTS

| | | | | |
|---|---|---|---|---|
| 2005/0251013 | A1* | 11/2005 | Krishnan | G06T 7/0012 600/407 |
| 2007/0081707 | A1* | 4/2007 | Sirohey | G16Z 99/00 382/128 |
| 2007/0276214 | A1* | 11/2007 | Dachille | G16H 30/40 600/407 |
| 2011/0311116 | A1* | 12/2011 | Benn | G06T 11/00 382/128 |
| 2012/0087563 | A1* | 4/2012 | Ionasec | G06T 19/006 382/128 |
| 2012/0165674 | A1* | 6/2012 | Abe | A61B 8/5284 600/443 |
| 2013/0158557 | A1* | 6/2013 | Komistek | A61B 17/15 623/22.21 |
| 2016/0210435 | A1* | 7/2016 | Neumann | G09B 23/288 |
| 2017/0304005 | A1* | 10/2017 | Maino | A61C 1/084 |
| 2018/0028265 | A1* | 2/2018 | Azevedo Da Silva | A61B 34/10 |
| 2020/0054306 | A1 | 2/2020 | Mehanian et al. | |
| 2020/0138394 | A1* | 5/2020 | Vanden Berghe | G16H 50/30 |
| 2020/0349699 | A1* | 11/2020 | Shah | G06F 40/40 |
| 2021/0346091 | A1* | 11/2021 | Haslam | G16H 30/40 |

OTHER PUBLICATIONS

Chen, J. et al., "Quantitative Analysis and Automated Lung Ultrasound Scoring for Evaluating COVID-19 Pneumonia With Neural Networks," IEEE Transactions On Ultrasonics, Ferroelectrics, And Frequency Control, 2021, vol. 68, No. 7, pp. 2507-2515.

Smith, M.J. et al., "Point-of-care lung ultrasound in patients with COVID-19—a narrative review," Anaesthesia, 2020, vol. 75, pp. 1096-1104.

Bhandary, A. et al., "Deep-learning framework to detect lung abnormality—A study with chest X-Ray and lung CT scan images," Pattern Recognition Letters, 2020, vol. 129, pp. 271-278.

Blendowski, M. et al., "Combining MRF-based deformable registration and deep binary 3D-CNN descriptors for large lung motion estimation in COPD patients," International Journal of Computer Assisted Radiology and Surgery, 2019, vol. 14, pp. 43-52.

Born, J. et al., "Accelerating Detection of Lung Pathologies with Explainable Ultrasound Image Analysis," Appl. Sci., 2021, vol. 11, 23 pages.

Rajinikanth, V. et al., "A Customized VGG19 Network with Concatenation of Deep and Handcrafted Features for Brain Tumor Detection," Appl. Sci., 2020, vol. 10, 13 pages.

\* cited by examiner

METHODS AND SYSTEMS FOR CLINICAL SCORING A LUNG ULTRASOUND

CROSS-REFERENCE TO PRIOR APPLICATIONS

This application is the U.S. National Phase application under 35 U.S.C. § 371 of International Application No. PCT/EP2022/086531, filed on Dec. 19, 2022, which claims the benefit of U.S. Provisional Patent Application No. 63/293,232, filed Dec. 23, 2021 and European Patent Application No. 22150471.5, filed on Jan. 6, 2022. These applications are hereby incorporated by reference herein.

GOVERNMENT INTEREST

This invention was made with United States government support awarded by the United States Department of Health and Human Services under the grant number HHS/ASPR/BARDA 75A50120C00097. The United States has certain rights in this invention.

FIELD OF THE INVENTION

The present disclosure is directed generally to methods and systems for analyzing lung ultrasound imaging to extract and provide information about lung-related clinical features.

BACKGROUND OF THE INVENTION

Lung ultrasound imaging is an important tool for disease screening, monitoring, diagnostic support, and management. Important clinical features—such as B-lines, merged B-lines, pleural line changes, consolidations, and pleural effusions, among others—can be identified using lung ultrasound. The combined presence of these features are predictors of a range of pulmonary and infectious diseases, including COVID-19 pneumonia. However, effectively identifying clinical features using lung ultrasound can depend on operator experience, image quality, and selection of imaging settings, among other variables. Thus, identifying clinical features is a challenging skill to learn, and success typically requires extensive specialized training and experience.

Automated quantification tools offer the potential to simplify and standardize image interpretation tasks, including ultrasound analysis. Studies have shown a correlation between automated lung ultrasound features and expert ratings, as well as correlation to gold standard measurements such as blood tests or chest CT. Automated analysis may even be used diagnostically for conditions such as COVID-19 pneumonia.

Automated tools that utilize traditional image processing techniques are well-suited to extracting explainable image parameters that support human clinical interpretation. Image processing methods additionally benefit from potential advantages in simplicity, speed, and generalizability. A significant drawback, however, is that the performance of these techniques depends largely on the discriminatory power of the handcrafted parameters.

As an alternative to using handcrafted parameters derived from traditional image processing algorithms, machine learning and artificial intelligence-based techniques have gained popularity in the medical imaging domain, including for lung ultrasound applications. However, a drawback of machine learning and artificial intelligence-based approaches is the lack of transparency, as human users are unable to interpret the black box predictions of these models.

SUMMARY OF THE INVENTION

Accordingly, there is a need for automated lung ultrasound quantification tools capable of producing and presenting exam-level information about lung-related clinical features in an understandable and interpretable manner.

The present disclosure is directed to inventive methods and systems for analysis of ultrasound lung imaging. Various embodiments and implementations herein are directed to an ultrasound analysis system optionally comprising an ultrasound device configured to obtain an ultrasound image of the patient's lungs, comprising data about at least one lung-related clinical feature. The system is configured to extract and provide information about a plurality of different lung-related clinical features. Accordingly, the system selects one of the plurality of different lung-related clinical features for analysis. An image processing algorithm is utilized to analyze the ultrasound image data in order to extract one or more image parameters of the selected lung-related clinical feature, where the image processing algorithm is defined to analyze the selected lung-related clinical feature. A trained machine learning algorithm is utilized to analyze the ultrasound image data in order to extract one or more learned parameters of the selected lung-related clinical feature, where the trained machine learning algorithm is trained to analyze the selected lung-related clinical feature. The extracted one or more image parameters and the extracted one or more learned parameters of the selected first lung-related clinical feature are combined to generate a final lung-related clinical feature analysis for the selected lung-related clinical feature, and the system provides the generated final lung-related clinical feature analysis to user via a user interface of the ultrasound analysis system. The method can be repeated—sequentially or simultaneously—for one or more others of the plurality of different lung-related clinical features. The user interface can provide information about two or more of the plurality of different lung-related clinical features to the user either sequentially or simultaneously, or upon request.

Generally in one aspect, a method for analyzing ultrasound image data is provided. The method includes: (i) receiving ultrasound image data for at least a portion of a lung of a patient, the ultrasound image data comprising at least one lung-related clinical feature; (ii) selecting a first of the at least one lung-related clinical feature; (iii) analyzing, using an image processing algorithm, the ultrasound image data to extract one or more image parameters of the selected first lung-related clinical feature, wherein the image processing algorithm is defined to analyze the selected first lung-related clinical feature; (iv) analyzing, using a trained machine learning algorithm, the ultrasound image data to extract one or more learned parameters of the selected first lung-related clinical feature, wherein the trained machine learning algorithm is trained to analyze the selected first lung-related clinical feature; (v) combining the extracted one or more image parameters and the extracted one or more learned parameters of the selected first lung-related clinical feature to generate a final lung-related clinical feature analysis for the selected first lung-related clinical feature; and (vi) providing, via a user interface, the generated final lung-related clinical feature analysis for the selected first lung-related clinical feature. According to an embodiment, the method further includes determining, using the final lung-related clinical feature analysis for the selected first lung-related clinical feature, a clinical assessment for the patient; wherein the step of providing further comprises providing, via the user interface, the determined clinical assessment for the patient.

According to an embodiment, the extracted one or more image parameters and the extracted one or more learned parameters of the selected first lung-related clinical feature are combined using a hybrid model.

According to an embodiment, the clinical assessment for the patient is determined using a hybrid model.

According to an embodiment, the method is repeated such that: a second of the at least one lung-related clinical feature is selected; the selected second lung-related clinical feature is analyzed by the image processing algorithm to extract one or more image parameters of the selected second lung-related clinical feature; the selected second lung-related clinical feature is analyzed by the trained machine learning algorithm to extract one or more learned parameters of the selected second lung-related clinical feature; and the extracted one or more image parameters and the extracted one or more learned parameters of the selected second lung-related clinical feature are combined to generate a final lung-related clinical feature analysis for the selected second lung-related clinical feature. According to an embodiment, providing via the user interface further comprises providing the generated final lung-related clinical feature analysis for the selected second lung-related clinical feature. According to an embodiment, the method further includes determining, using the final lung-related clinical feature analysis for the selected first lung-related clinical feature and the final lung-related clinical feature analysis for the selected second lung-related clinical feature, a clinical assessment for the patient; wherein the step of providing further comprises providing, via the user interface, the determined clinical assessment for the patient.

According to an embodiment, providing via the user interface further comprises providing the extracted one or more image parameters and the extracted one or more learned parameters of the selected first lung-related clinical feature.

According to an embodiment, the extracted one or more image parameters of the selected first lung-related clinical feature comprises a clinical feature vector, and further wherein the extracted one or more learned parameters of the selected first lung-related clinical feature comprises a clinical feature vector.

According to an embodiment, the step of combining comprises combining the extracted one or more image parameters and the extracted one or more learned parameters of each of two or more selected lung-related clinical features to generate a final lung-related clinical feature analysis.

According to a second aspect is an ultrasound analysis system. The system includes ultrasound image data for at least a portion of a lung of a patient, the ultrasound image data comprising at least one lung-related clinical feature; an image processing algorithm defined to analyze a selected first lung-related clinical feature; and a trained machine learning algorithm trained to analyze the selected first lung-related clinical feature. The system further includes a processor configured to: (i) select the first of the at least one lung-related clinical feature; (ii) analyze, using the image processing algorithm, the ultrasound image data to extract one or more image parameters of the selected first lung-related clinical feature; (iii) analyze, using the trained machine learning algorithm, the ultrasound image data to extract one or more learned parameters of the selected first lung-related clinical feature; (iv) combine the extracted one or more image parameters and the extracted one or more learned parameters of the selected first lung-related clinical feature to generate a final lung-related clinical feature analysis for the selected first lung-related clinical feature. The system further includes a user interface configured to provide the generated final lung-related clinical feature analysis for the selected first lung-related clinical feature.

According to an embodiment, the processor is further configured to determine, using at least the final lung-related clinical feature analysis for the selected first lung-related clinical feature, a clinical assessment for the patient; and the user interface is further configured to provide the determined clinical assessment for the patient.

According to an embodiment, the system further includes a hybrid model configured to combine the extracted one or more image parameters and the extracted one or more learned parameters of the selected first lung-related clinical feature to generate the final lung-related clinical feature analysis for the selected first lung-related clinical feature.

In general, the hybrid prediction model uses features extracted from both the image processing algorithm and the trained machine learning algorithm. It has been found that combining these features provides an improved prediction compared to the predictions which are obtained from these two sets of features alone. The features extracted from the image processing algorithm are conventionally used to determine a feature prediction for the image processing algorithm. The features extracted from the trained machine learning algorithm are conventionally used to determine a feature prediction for the trained machine learning algorithm.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Figure 1:
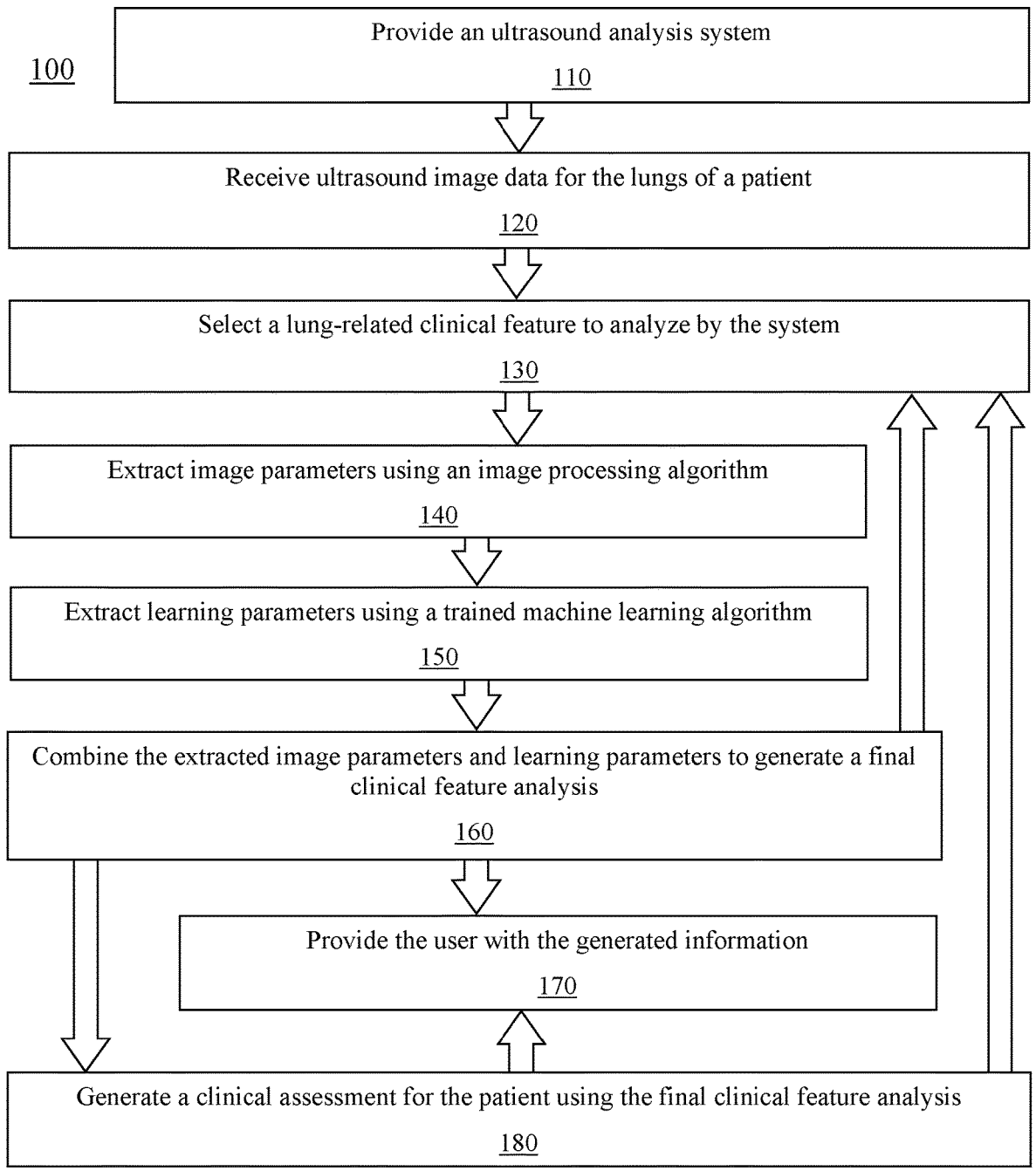
FIG. 1 is a flowchart of a method for analyzing ultrasound image data using an ultrasound analysis system, in accordance with an embodiment.

The present disclosure describes various embodiments of an ultrasound analysis system and method. More generally, Applicant has recognized and appreciated that it would be beneficial to provide an ultrasound analysis that automatically generates information about lung-related clinical features. For example, an ultrasound analysis system receives or obtains ultrasound image data comprising lung-related clinical features. The system extracts and provides information about a plurality of different lung-related clinical features from the ultrasound image data. Accordingly, the system selects one of the plurality of different lung-related clinical features for analysis. An image processing algorithm is utilized to analyze the ultrasound image data in order to extract one or more image parameters of the selected lung-related clinical feature, where the image processing algorithm is defined to analyze the selected lung-related clinical feature. A trained machine learning algorithm is utilized to analyze the ultrasound image data in order to extract one or more learned parameters of the selected lung-related clinical feature, where the trained machine learning algorithm is trained to analyze the selected lung-related clinical feature. The extracted one or more image parameters and the extracted one or more learned parameters of the selected first lung-related clinical feature are combined to generate a final lung-related clinical feature analysis for the selected lung-related clinical feature, and the system provides the generated final lung-related clinical feature analysis to user via a user interface of the ultrasound analysis system. The method can be repeated—sequentially or simultaneously—for one or more others of the plurality of different lung-related clinical features. The user interface can provide information about two or more of the plurality of different lung-related clinical features to the user either sequentially or simultaneously, or upon request.

According to an embodiment, the ultrasound analysis system and method disclosed or otherwise envisioned herein provides a hybrid algorithmic approach for identifying lung ultrasound features using a combination of image processing and machine learning processes. Image processing features are merged with learned features to provide a hybrid prediction model that operates on both sets of inputs. The results of all three components—image processing predictions, machine learning predictions, and final combined predictions—are provided to the user in an interpretable and intuitive manner. This hybrid approach is particularly advantageous when a clinical dataset size is small, computational resources are limited, or when model simplicity and interpretability are of primary importance. The approach increases confidence in analytical results and lowers acceptance barriers as it puts the results in context with traditional interpretable features and shows the additional benefit provided by the system.

In particular, the hybrid approach provides an improved prediction for the features relative to the image processing prediction and the machine learning prediction alone.

Additionally, the hybrid approach enables the use of machine learning algorithms when the clinical dataset size (i.e., the data used to train the machine learning algorithms) is relatively small. This is because the combined prediction also uses the image processing algorithm prediction.

Thus, the ultrasound analysis system and method disclosed or otherwise envisioned herein provides numerous advantages over the prior art. Providing an ultrasound analysis system and method that enables the automated detection and analysis of lung-related clinical features in an understandable and interpretable manner can prevent serious lung injury, improve lung diagnoses and patient outcomes, and thus potentially save lives.

Referring to FIG. 1, in one embodiment, is a flowchart of a method 100 for analyzing ultrasound image data using an ultrasound analysis system. The methods described in connection with the figures are provided as examples only, and shall be understood not to limit the scope of the disclosure. The ultrasound analysis system can be any of the systems described or otherwise envisioned herein. The ultrasound analysis system can be a single system or multiple different systems.

Figure 2:
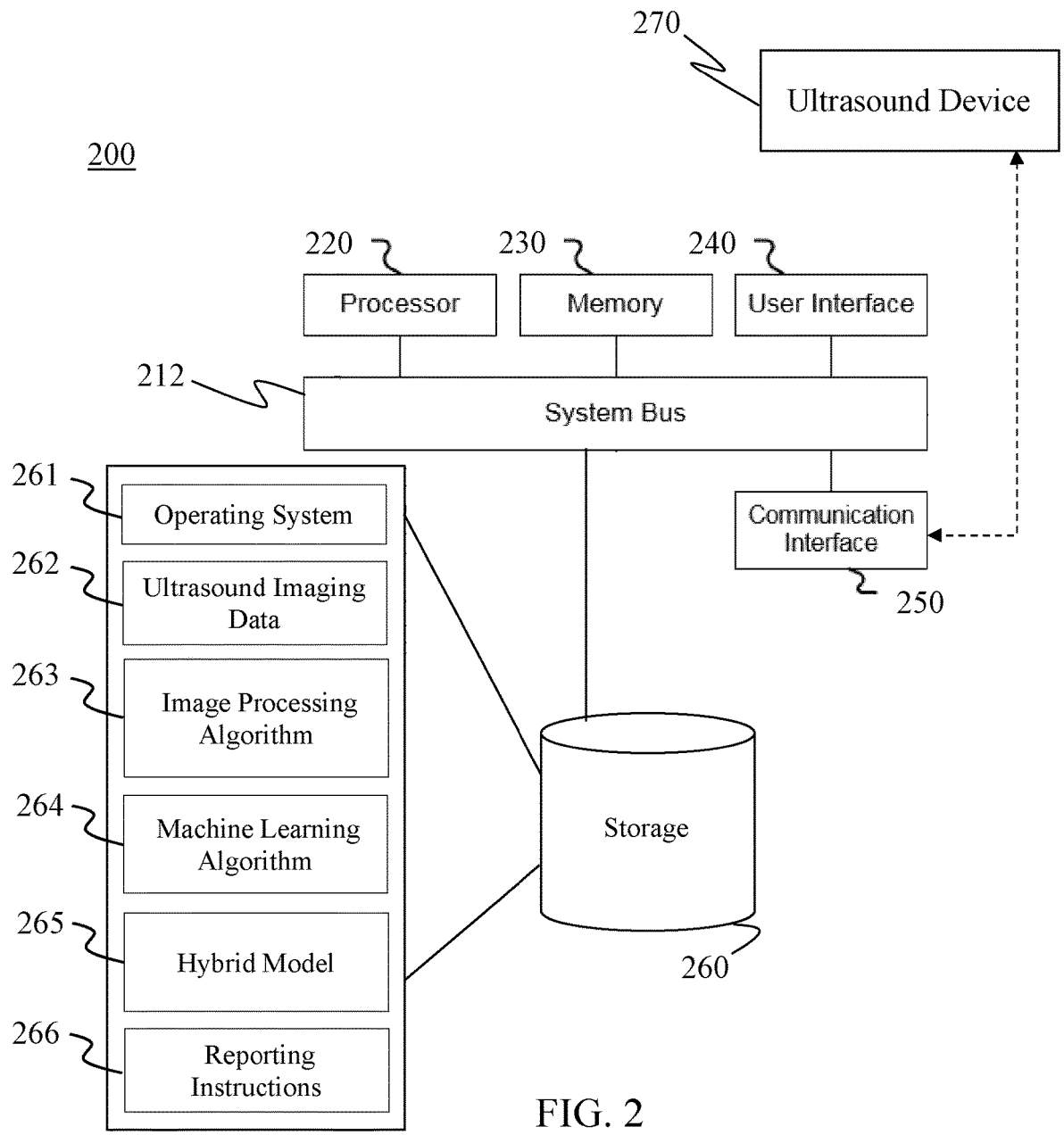
FIG. 2 is a schematic representation of an ultrasound analysis system, in accordance with an embodiment.

At step 110 of the method, an ultrasound analysis system 200 is provided. Referring to an embodiment of an ultrasound analysis system 200 as depicted in FIG. 2, for example, the system comprises one or more of a processor 220, memory 230, user interface 240, communications interface 250, storage 260, and ultrasound device 270, interconnected via one or more system buses 212. It will be understood that FIG. 2 constitutes, in some respects, an abstraction and that the actual organization of the components of the system 200 may be different and more complex than illustrated. Additionally, ultrasound analysis system 200 can be any of the systems described or otherwise envisioned herein. Other elements and components of system 200 are disclosed and/or envisioned elsewhere herein.

At step 120 of the method, ultrasound image data is sent to, obtained by, or otherwise received by the system. The ultrasound image data may comprise, for example, one or more single frames of ultrasound imaging, or may comprise a temporal sequence of ultrasound image data such as a video comprising a plurality of frames. Ultrasound image data may be obtained for a single region or zone of a patient's lung, or may be obtained for a plurality of different zones for one or more of the patient's lungs. For example, ultrasound image data may be obtained for one, two, or more zones. The ultrasound image data may be received by the system in real-time, or may be stored in local and/or remote memory and received by the system at a future point.

The ultrasound image data may be obtained using any ultrasound device or system, which may be any device or system suitable to obtain or otherwise receive ultrasound image data of the patient. One or more parameters of the ultrasound device can be set, adjusted, preprogrammed, or otherwise determined by a healthcare professional. The ultrasound device or system may be remote to, local to, or a component of, the ultrasound analysis system 200.

The ultrasound image data comprises data or other information about one or more of a plurality of different lung-related clinical features. According to an embodiment, a clinical feature is any recognizable aspect of a lung. A clinical feature may be a normal aspect of a lung or an abnormal aspect. A clinical feature may be indicative of a healthy lung or a diseased or injured lung. Thus, a clinical feature may be, for example, anything that can be identified within or from ultrasound image data. Examples of clinical features include A-lines, B-lines, merged B-lines, pleural line abnormalities, consolidation, pleural effusion, and many others.

At step 130 of the method, one or more of the plurality of clinical features are selected for analysis by the system in downstream steps of the method. The system can be configured, programmed, or otherwise designed to select a clinical feature from among a list of different clinical features such as A-lines, B-lines, merged B-lines, pleural lines, small and large consolidations, pleural effusion, and many others. For example, B-lines can be selected first for analysis by the system.

According to an embodiment, the selection of the clinical feature for analysis by the system could be based on a user selection or option, predetermined programming, an aspect of the ultrasound exam itself such as the purpose for the exam or the type of exam, among other possible selection mechanisms. For example, a user could provide a list of one or more clinical features for analysis, or could select one or more clinical features from a menu of possible clinical features. As another option, the system could be configured, programmed, or otherwise designed to automatically analyze a given list of different clinical features, in a particular order or configuration. This automatic order or configuration, however, could be adjustable based on user input or other information such as the purpose for the exam or the type of exam, among many other possible adjustment mechanisms.

According to an embodiment, as discussed in greater detail below, the system may return to step 130 in order to select a second clinical feature for analysis by the system in downstream steps of the method. The analysis of the second selected clinical feature may be performed simultaneously with, or sequentially to, the analysis of the first selected clinical feature. Thus, the system may analyze a plurality of the different possible clinical features. As just one non-limiting example, where the first selected clinical feature was B-lines, the second selected clinical feature can be pleural lines. Many other clinical features, and ordering of analysis of those clinical features, are possible.

At step 140 of the method, the system utilizes an image processing algorithm to analyze the received ultrasound image data in order to extract one or more image parameters of the selected first lung-related clinical feature. The image processing algorithm is selected, programmed, configured, or otherwise designed to specifically analyze the selected first lung-related clinical feature, meaning that the image processing algorithm will recognize and extract parameters for the selected first lung-related clinical feature. Thus, according to an embodiment, the ultrasound analysis system comprises a plurality of different image processing algorithms, each configured to recognize and extract parameters for a specific one of the plurality of different possible lung-related clinical features. Alternatively, the system comprises a single image processing algorithm that is adjustable or otherwise modifiable to analyze different clinical features. For example, the single image processing algorithm may be adjustable with a first set of parameters designed to cause the algorithm to analyze a first type of clinical feature, and may be adjustable with a second set of parameters designed to cause the algorithm to analyze a second type of clinical feature, and so on. The one or more image processing algorithms, and/or the configuration parameters for the image processing algorithm(s), may be stored in local and/or remote memory.

According to an embodiment, one advantage of conventional image processing is the ability to extract explainable features that support human clinical interpretation. A unique set of parameters may be defined for each clinical feature. An example of an image processing algorithm or module is the Lumify® B-lines algorithm, which extracts up to seven parameters associated with B-line intensity, depth, motion, speckle, and other descriptive characteristics. These are outputted as a 1×7 parameter vector. A similar image processing algorithm or module could characterize pleural line features, consolidations, or any other clinical feature. In each case, the output could be, for example, a 1×K parameter vector, where K is the number of image parameters used.

According to an embodiment, the output of the analysis by the image processing algorithm is a prediction score alone or in combination with the extracted 1×K parameter vector, although other outputs are possible. The prediction score may be a score that is generated by the image processing algorithm that a clinical feature is present or absent, and may be based on the parameters regarding the clinical feature that are extracted by the image processing algorithm.

Once extracted or generated by the image processing algorithm, the parameters, the 1×K parameter vector, and/or prediction score may be utilized immediately in downstream steps of the method, or may be stored in local and/or remote memory for future use.

Figure 3:
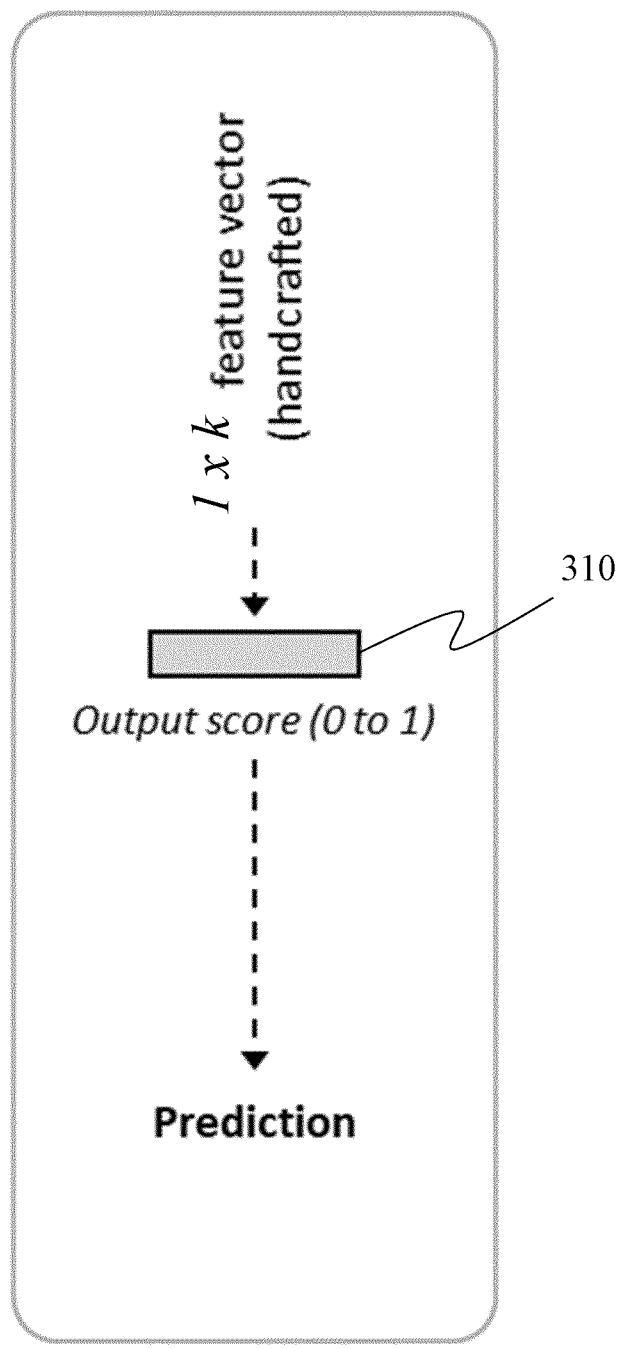
FIG. 3 is a flowchart of a method for analyzing ultrasound image data using an ultrasound analysis system, in accordance with an embodiment.

Referring to FIG. 3, in one embodiment, is a schematic representation of step 140 of the method. An image processing algorithm 310 extracts K features about a selected clinical feature to generate a 1×K feature vector, and provides a prediction score.

At step 150 of the method, the system utilizes a trained machine learning algorithm to analyze the received ultrasound image data in order to extract one or more learned parameters of the selected first lung-related clinical feature. The trained machine learning algorithm is trained, programmed, configured, or otherwise designed to specifically analyze the selected first lung-related clinical feature, meaning that the trained machine learning algorithm will recognize and extract parameters for the selected first lung-related clinical feature. Thus, according to an embodiment, the ultrasound analysis system comprises a plurality of different trained machine learning algorithm, each trained or configured to recognize and extract parameters for a specific one of the plurality of different possible lung-related clinical features. The trained machine learning algorithms may be stored in local and/or remote memory.

According to an embodiment, one advantage of analysis by a trained machine learning algorithm is the ability to identify parameters that may be missing from the set of image processing parameters extracted by the image processing algorithm. Given sufficient data, the machine learning models can identify more complex or abstract features associated with clinical pathology but not easily captured using image processing. According to an embodiment, the machine learning models be a deep neural network or may be another model such as random forest classifier, support vector machine classifier, boosting classifier, or any other type of machine learning model or algorithm.

According to an embodiment, the output of the analysis by the trained machine learning algorithm is a 1×M vector, where M is the number of automatically learned parameters. A regression or classification model that outputs a single prediction score could use M=1.

According to an embodiment, the output of the analysis by the trained machine learning algorithm is a prediction score alone or in combination with the extracted 1×M parameter vector, although other outputs are possible. The prediction score may be a score that is generated by the trained machine learning algorithm that a clinical feature is present or absent, and may be based on the parameters regarding the clinical feature that are extracted by the trained machine learning algorithm.

Once extracted or generated by the image processing algorithm, the parameters, the 1×M parameter vector, and/or prediction score may be utilized immediately in downstream steps of the method, or may be stored in local and/or remote memory for future use.

Figure 4:
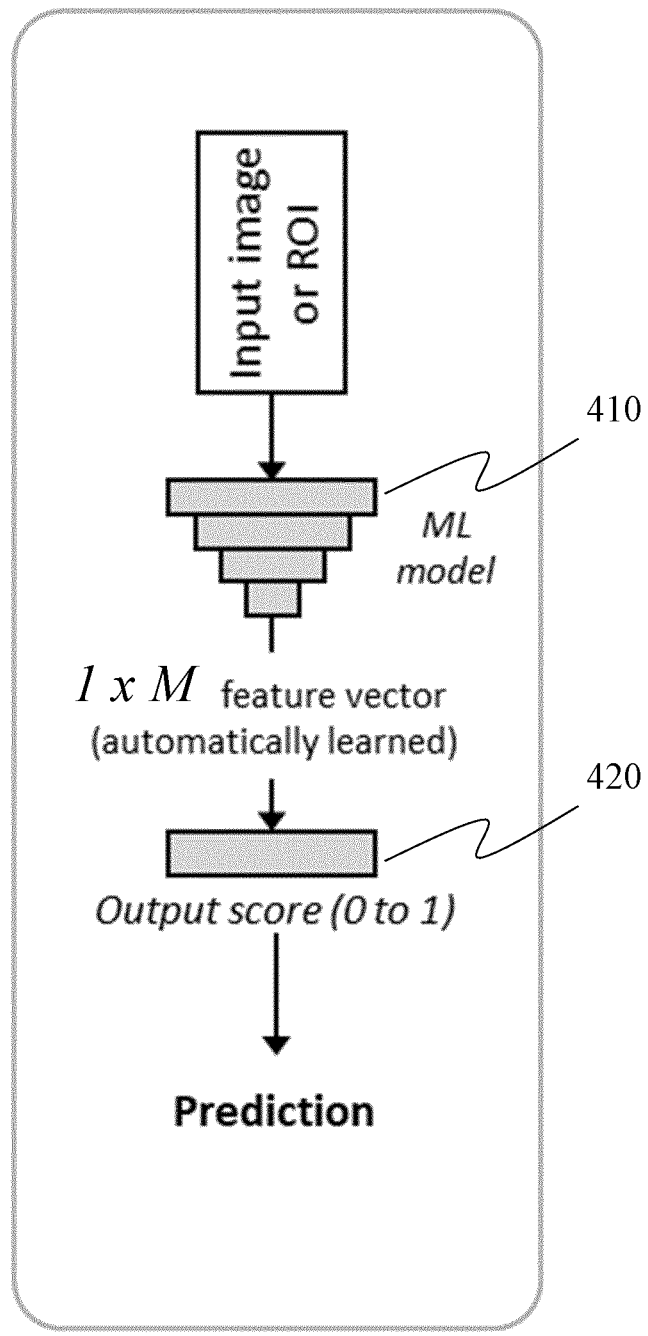
FIG. 4 is a flowchart of a method for analyzing ultrasound image data using an ultrasound analysis system, in accordance with an embodiment.

Referring to FIG. 4, in one embodiment, is a schematic representation of step 150 of the method. An image processing algorithm 410 extracts M features about a selected clinical feature to generate a 1×M feature vector, and provides at 420 a prediction score.

At step 160 of the method, the ultrasound analysis system combines the image processing-derived parameters and machine learning-derived parameters about the selected lung-related clinical feature to generate a final lung-related clinical feature analysis, which may be a single final prediction about the presence or absence of the clinical feature, a likelihood or probability of the feature, confidence score for the feature, severity of the feature, a diagnosis and/or prognosis, a clinical recommendation, a clinical outcome prediction, or another lung-related clinical assessment of the patient. According to an embodiment, the ultrasound analysis system comprises a hybrid model configured to combine the extracted one or more image parameters and the extracted one or more learned parameters of the selected first lung-related clinical feature. The hybrid model may be stored in local and/or remote memory.

Figure 5:
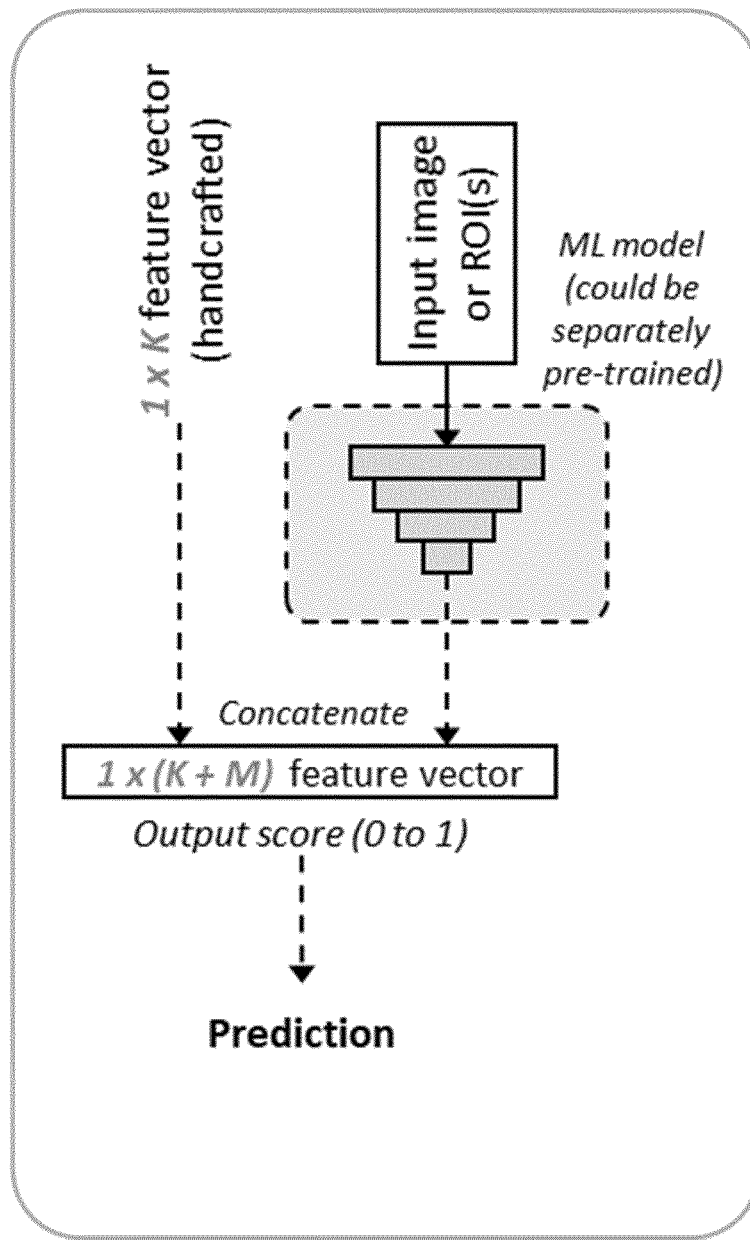
FIG. 5 is a flowchart of a method for analyzing ultrasound image data using an ultrasound analysis system, in accordance with an embodiment.

The hybrid model may be optimized by combining the image processing and machine learning parameters in one or more of a variety of different ways. For example, according to one embodiment the two sets of parameters are concatenated, and a separate classifier is trained on the concatenated parameter vector. Referring to FIG. 5, in one embodiment, is a flowchart of a configuration of the hybrid model that combines K features from the image processing algorithm (such as a vector comprising the K features) and M features from the trained machine learning algorithm (such as a vector comprising the M features). The combined 1×(K+M) feature set is used by the hybrid classifier model to produce the output of the model, such as a prediction of the presence or absence of the first selected clinical feature, a likelihood or probability of the feature, confidence score for the feature, severity of the feature, a diagnosis and/or prognosis, a clinical recommendation, a clinical outcome prediction, or another lung-related clinical assessment of the patient.

Figure 6:
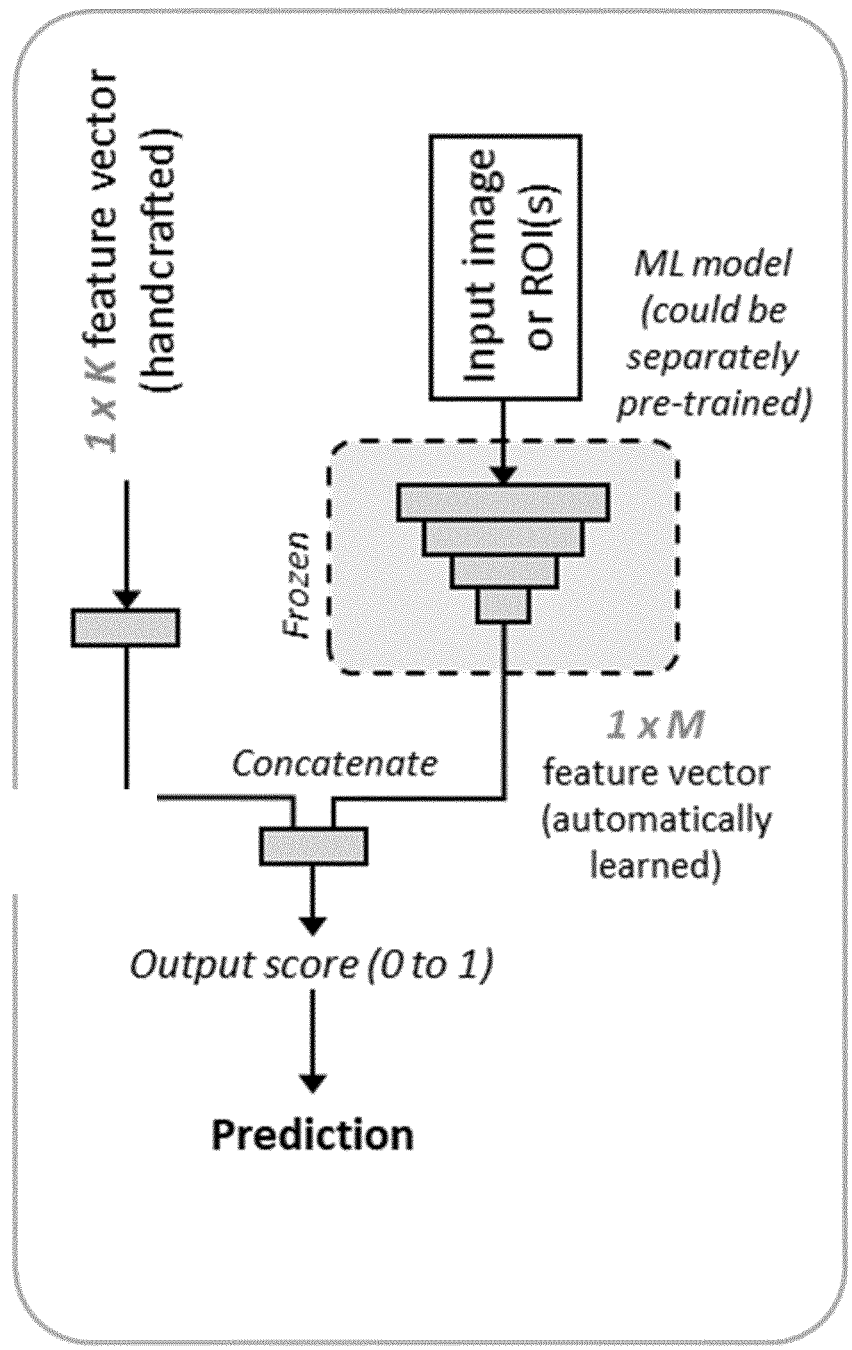
FIG. 6 is a flowchart of a method for analyzing ultrasound image data using an ultrasound analysis system, in accordance with an embodiment.

Referring to FIG. 6, in one embodiment, is a flowchart of a configuration of the hybrid model that feeds the extracted K features from the image processing algorithm as additional input into the trained machine learning algorithm to generate an output of the model, such as a prediction of the presence or absence of the first selected clinical feature, a likelihood or probability of the feature, confidence score for the feature, severity of the feature, a diagnosis and/or prognosis, a clinical recommendation, a clinical outcome prediction, or another lung-related clinical assessment of the patient. The model, with the combined inputs, can either be retrained from scratch or fine-tuned. When fine-tuned, the previous machine/deep learning model could be adjusted or retrained, and the model refinement can be applied only to the part of the model associated with the newly added image processing parameters.

Once generated by the hybrid model of the ultrasound analysis system, the generated final lung-related clinical feature analysis, which may comprise a prediction about the presence or absence of the clinical feature, a likelihood or probability of the feature, confidence score for the feature, severity of the feature, a diagnosis and/or prognosis, a clinical recommendation, a clinical outcome prediction, or another lung-related clinical assessment of the patient, may be utilized immediately in downstream steps of the method, or may be stored in local and/or remote memory for future use.

According to an embodiment, the ultrasound analysis system combines the image processing-derived parameters and machine learning-derived parameters about each of two or more different selected lung-related clinical feature types to generate a final lung-related clinical feature analysis, which may be a single final prediction about the presence or absence of one or more of the clinical features, a likelihood or probability of one or more of the clinical features, a confidence score for one or more of the clinical features, severity of one or more of the clinical features, a diagnosis and/or prognosis, a clinical recommendation, a clinical outcome prediction, or other lung-related clinical assessment of the patient. According to an embodiment, the ultrasound analysis system comprises a hybrid model configured to combine the extracted one or more image parameters and the extracted one or more learned parameters of the selected two or more different lung-related clinical feature types. The hybrid model may be stored in local and/or remote memory.

At step 170 of the method, the generated final lung-related clinical feature analysis for the selected first lung-related clinical feature is provided to a user via a user interface of the ultrasound analysis system. The generated final lung-related clinical feature analysis may be any information generated by the system during the analysis, including but not limited to the extracted K features or vector from the image processing algorithm, the M features or vector from the trained machine learning algorithm, and/or the final lung-related clinical feature analysis generated by the hybrid model. Other information is possible as well, including but not limited to the identity of the patient, patient demographics, diagnosis or treatment information, and a wide variety of other possible information. The information can be provided via the user interface using any method for conveying or displaying information, and the user interface can be any device, interface, or mechanism for providing the conveyed or displayed information. Thus, according to an embodiment, in order to facilitate interpretability and transparency, a quantitative or visual display is provided for the user via the user interface.

Figure 7:
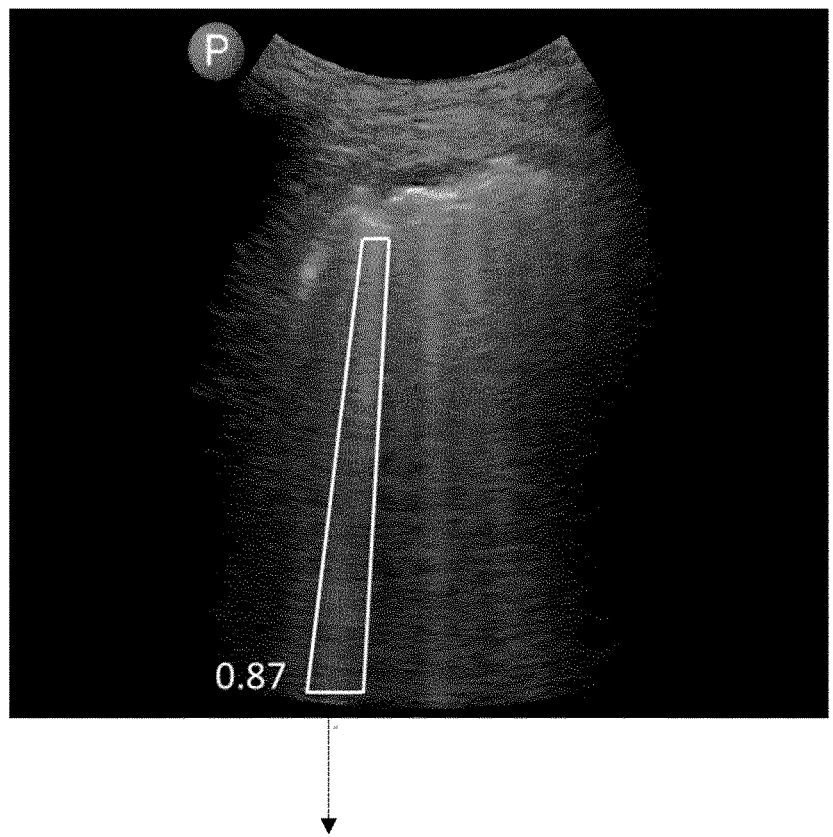
FIG. 7 is a schematic representation of a visual display, in accordance with an embodiment.
Figure 7:
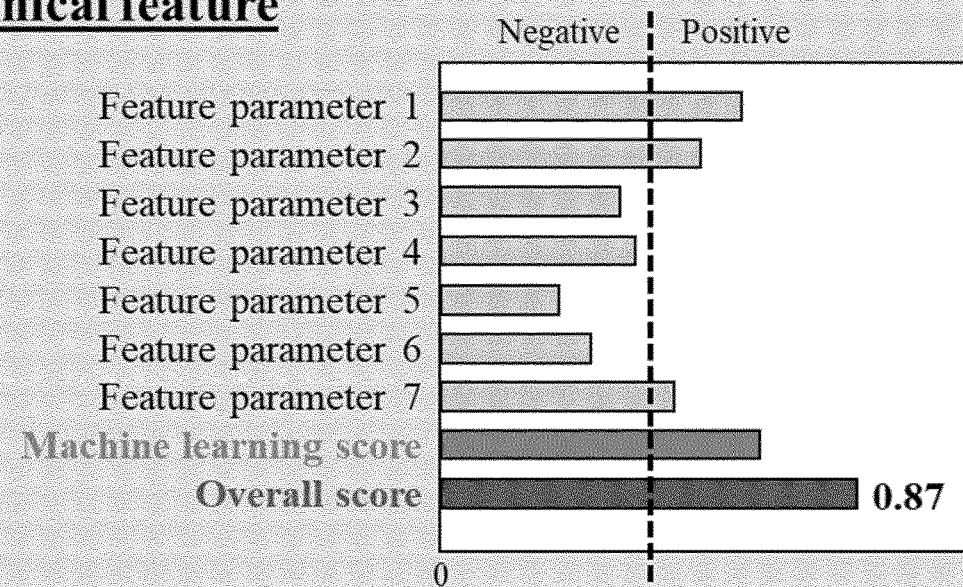

Referring to FIG. 7, in one embodiment of a visual display provided to the user via a user interface of the ultrasound analysis system, is a display of extracted image processing parameters from the image processing algorithm. The figure comprises data for a first type of clinical feature, which can be any selected clinical feature for the analysis. In this embodiment, the extracted image processing parameters are shown separately or together with other parameters or predictions. For example, the analysis comprises seven parameters, although more or fewer parameters are possible, depending on the clinical feature selected for analysis. Optionally, the display includes the prediction from the machine learning algorithm ("A.I. score") and the prediction from the hybrid model ("Overall score"). Optionally, the display includes a final decision cutoff—here, a dotted black line—that comprises a final determination of the presence or absence of the clinical feature. According to an embodiment, for easier visual representation, each score can be re-scaled so that the same absolute cutoff serves as the best discriminator for all individual or combined scores.

Figure 8:
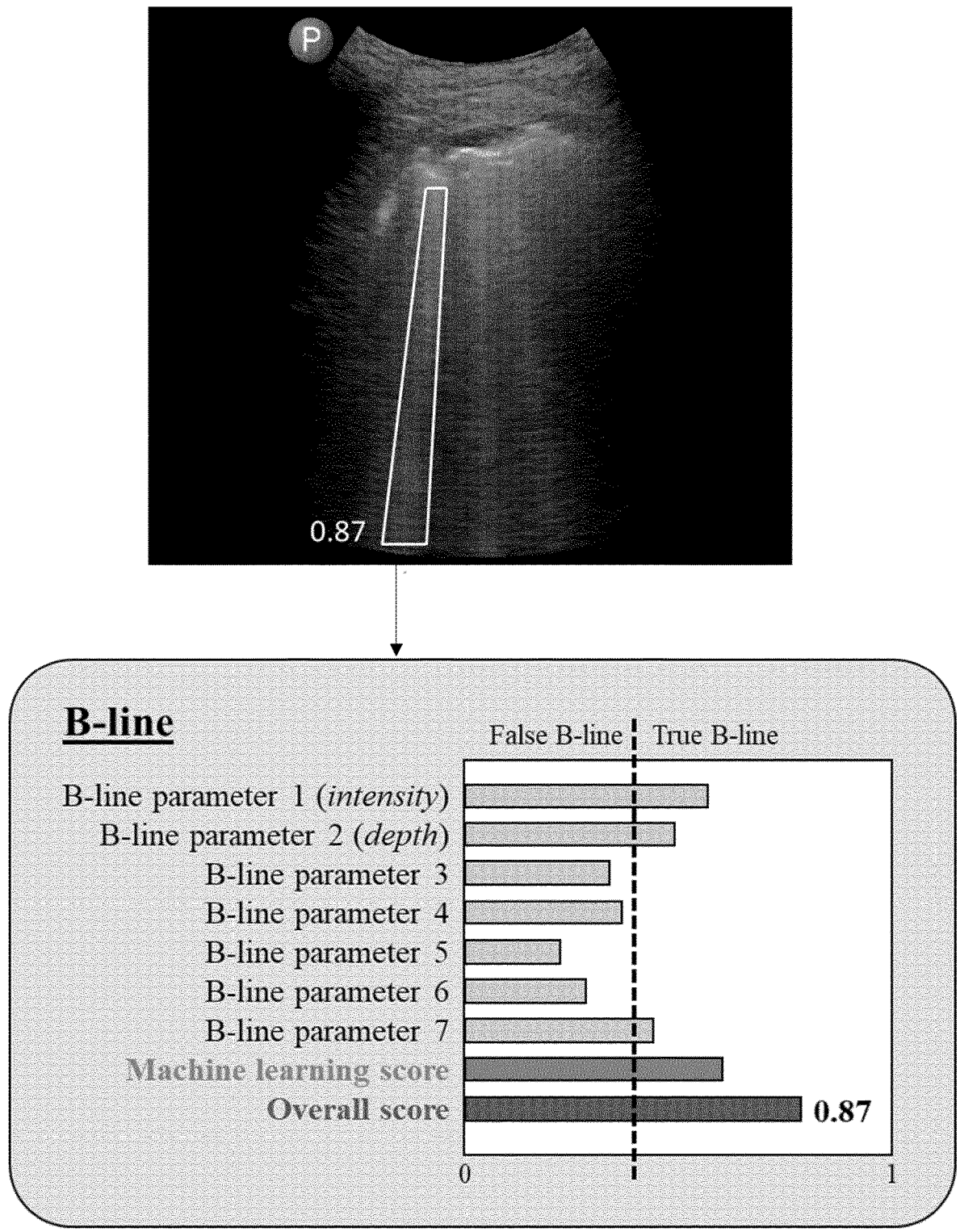
FIG. 8 is a schematic representation of a visual display, in accordance with an embodiment.

Referring to FIG. 8, in one embodiment of a visual display provided to the user via a user interface of the ultrasound analysis system, is a display of extracted image processing parameters from the image processing algorithm. The figure comprises data for B-line identification, and thus B-line was the selected clinical feature for the analysis. In this embodiment, the extracted image processing parameters are shown separately or together with other parameters or predictions. For example, the parameters utilized with B-lines for the image processing algorithm may include parameters such as B-lines homogeneity, B-lines reverberation, B-line speckle, B-lines motion, B-line width, B-line depth, and/or B-line intensity, among other possible parameters. Optionally, the display includes the prediction from the machine learning algorithm ("A.I. score") and the prediction from the hybrid model ("Overall score"). Optionally, the display includes a final decision cutoff—here, a dotted black line—that comprises a final determination of the presence or absence of the clinical feature, a likelihood or probability of the feature, confidence score for the feature, severity of the feature, a diagnosis and/or prognosis, a clinical recommendation, a clinical outcome prediction, or another lung-related clinical assessment of the patient. According to an embodiment, for easier visual representation, each score can be re-scaled so that the same absolute cutoff serves as the best discriminator for all individual or combined scores.

Figure 9:
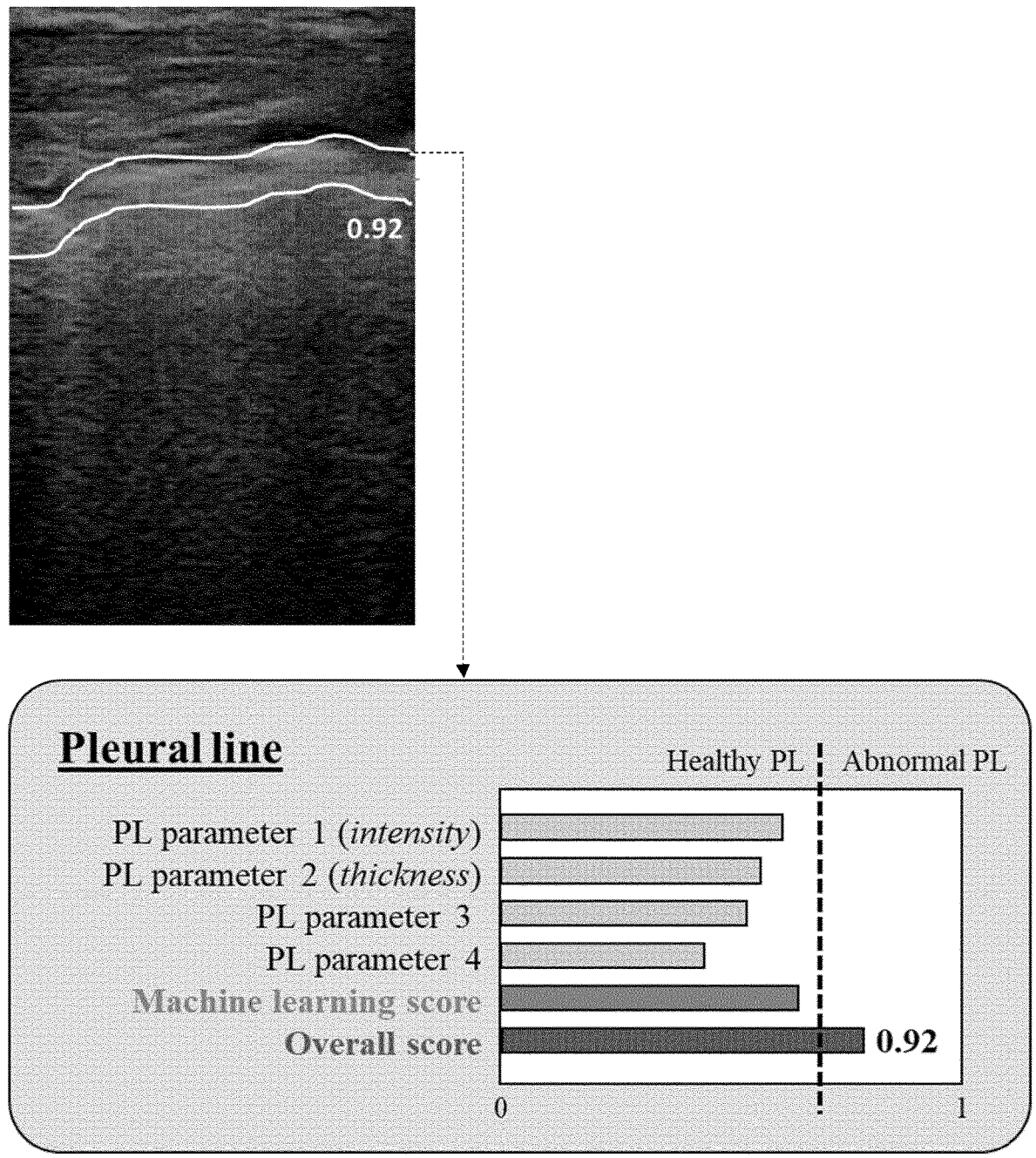
FIG. 9 is a schematic representation of a visual display, in accordance with an embodiment.

Referring to FIG. 9, in one embodiment of a visual display provided to the user via a user interface of the ultrasound analysis system, is a display of extracted image processing parameters from the image processing algorithm. The figure comprises data for pleural line identification, and thus pleural line was the selected clinical feature for the analysis. In this embodiment, the extracted image processing parameters are shown separately or together with other parameters or predictions. For example, the parameters utilized with pleural lines may include parameters such as pleural line thickness, pleural line discontinuity, pleural line irregularity, and/or pleural line brightness, among other possible parameters. Optionally, the display includes the prediction from the machine learning algorithm ("A.I. score") and the prediction from the hybrid model ("Overall score"). Optionally, the display includes a final decision cutoff—here, a dotted black line—that comprises a final determination of the presence or absence of the clinical feature, a likelihood or probability of the feature, confidence score for the feature, severity of the feature, a diagnosis and/or prognosis, a clinical recommendation, a clinical outcome prediction, or another lung-related clinical assessment of the patient. According to an embodiment, for easier visual representation, each score can be re-scaled so that the same absolute cutoff serves as the best discriminator for all individual or combined scores.

Figure 10:
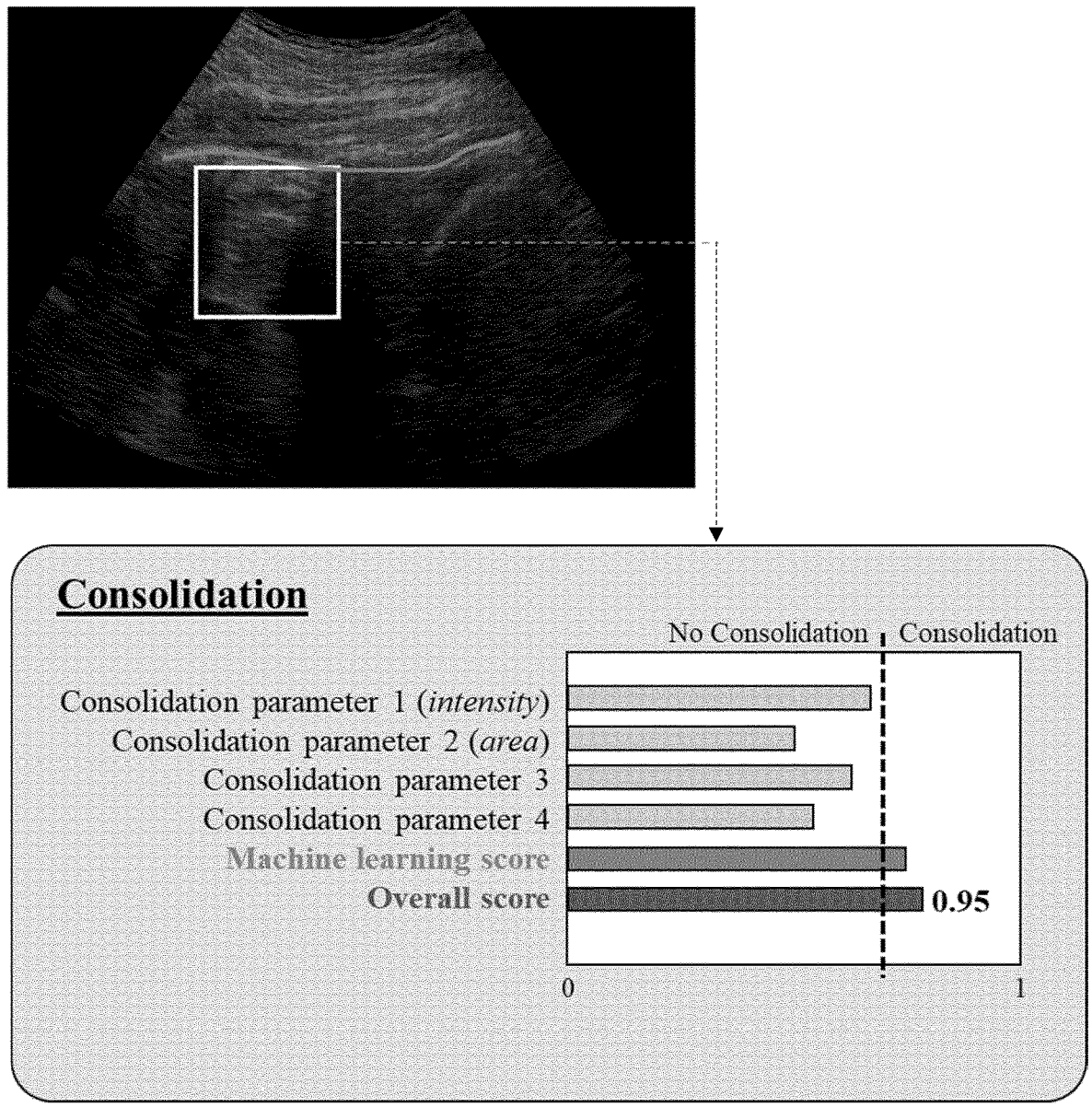
FIG. 10 is a schematic representation of a visual display, in accordance with an embodiment.

Referring to FIG. 10, in one embodiment of a visual display provided to the user via a user interface of the ultrasound analysis system, is a display of extracted image processing parameters from the image processing algorithm. The figure comprises data for consolidation identification, and thus consolidation was the selected clinical feature for the analysis. In this embodiment, the extracted image processing parameters are shown separately or together with other parameters or predictions. For example, the parameters utilized with consolidation may include parameters such as consolidation texture, relative brightness, air bronchogram, and/or pleural line proximity, among other possible parameters. Optionally, the display includes the prediction from the machine learning algorithm ("A.I. score") and the prediction from the hybrid model ("Overall score"). Optionally, the display includes a final decision cutoff—here, a dotted black line—that comprises a final determination of the presence or absence of the clinical feature, a likelihood or probability of the feature, confidence score for the feature, severity of the feature, a diagnosis and/or prognosis, a clinical recommendation, a clinical outcome prediction, or another lung-related clinical assessment of the patient. According to an embodiment, for easier visual representation, each score can be re-scaled so that the same absolute cutoff serves as the best discriminator for all individual or combined scores.

According to an embodiment, the user interface could summarize information over multiple exams (i.e., multiple time points). One implementation would present a summary dashboard for each time point. A second implementation would plot information for each time point on a single graph, such as disease progression plot charting the severity scores over time.

According to an embodiment, the system may return to step 130 after either step 160 or step 180 in order to select a second clinical feature for analysis by the system in downstream steps of the method. However, the analysis of the second selected clinical feature may be performed simultaneously with, or sequentially to, the analysis of the first selected clinical feature. Thus, the system may analyze a plurality of the different possible clinical features. As just one non-limiting example, where the first selected clinical feature was B-lines, the second selected clinical feature can be pleural lines. Many other clinical features, and ordering of analysis of those clinical features, are possible.

Returning to FIG. 1, at optional step 180 of the method, a clinical assessment for the patient is determined using the generated final lung-related clinical feature analysis for the selected first lung-related clinical feature. The clinical assessment may be determined or generated by the hybrid model of the system, and/or by any other model or algorithm of the system. According to an embodiment, the predictions for the presence or absence of two or more clinical features (B-lines, pleural lines, consolidation, pleural effusion)—or other assessment—are combined as input, and a clinical diagnosis or clinical severity is predicted as the output. Thus, the model or algorithm of the system is programmed, trained, configured, or otherwise designed to receive predictions for two or more clinical features, and generate a clinical diagnosis or clinical severity prediction as output.

Figure 11:
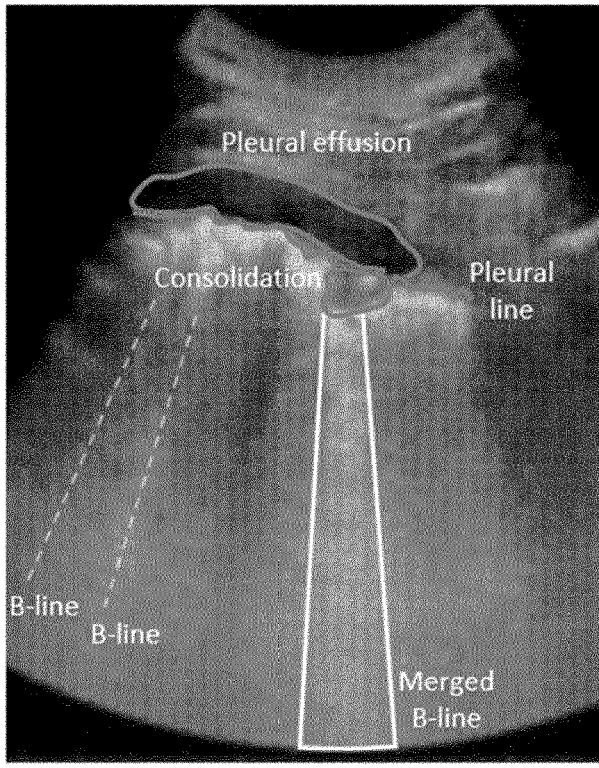
FIG. 11 is a schematic representation of a visual display, in accordance with an embodiment.
Figure 11:
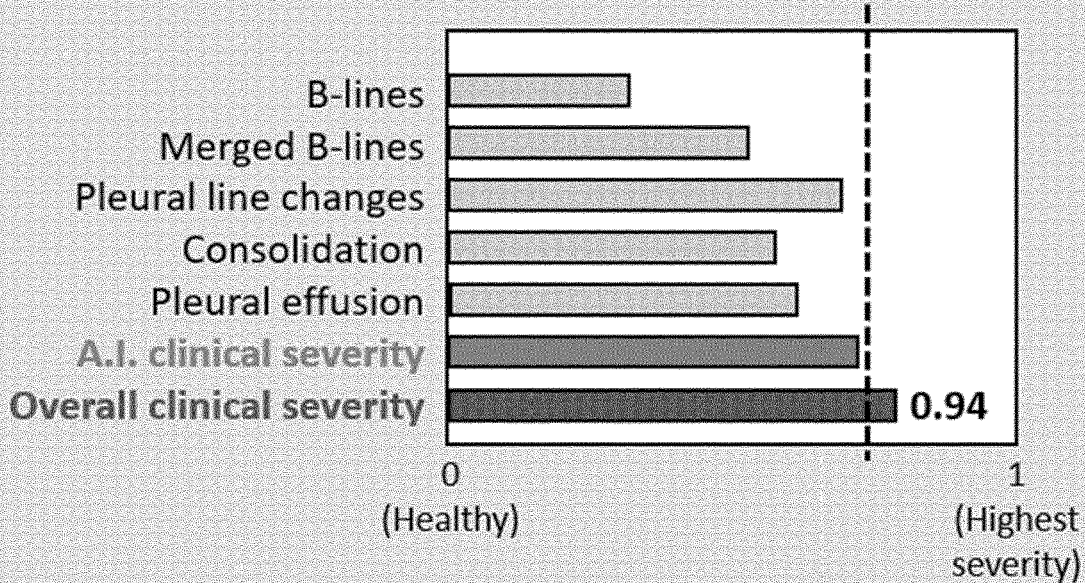

Referring to FIG. 11, in accordance with one embodiment of a visual display provided to the user via a user interface of the ultrasound analysis system, is a display of overall clinical severity for the patient as generated by the method. The figure—and thus the determination by the model or algorithm—comprises data for a plurality of clinical features including B-lines, merged B-lines, pleural line changes, consolidation, and pleural effusion. Fewer or more clinical features, and other combinations of clinical features, are possible. The determination and the visual display includes a prediction of overall clinical severity, comprising 0.94 in this example. Optionally, the display includes the prediction from the machine learning algorithm ("A.I. score"). Optionally, the display includes a final decision cutoff—here, a dotted black line—that comprises a final determination of the clinical diagnosis and/or severity.

Example 1

The following is a non-limiting example of one possible embodiment of the method and system described or otherwise envisioned herein. For this example, the effectiveness of the hybrid method approach for B-line classification was evaluated. Data was utilized from 60 patients (using 94 ultrasound cine loops). Performance for classification of B-line candidate regions using handcrafted features (based on image processing), machine learning, and the hybrid combination of handcrafted features and machine learning was assessed. Evaluation was based on the Precision, Recall and F1 metrics. All approaches were evaluated using 10-fold cross validation. Results are summarized in Table 1, showing best performance for the hybrid approach.

TABLE 1

Precision, recall, and F1 metrics for 10-fold cross validation of three different approaches for classification of B-lines from candidate regions.

| Approach | Precision | Recall | F1 Score |
| --- | --- | --- | --- |
| Image processing algorithm alone | 0.844 | 0.730 | 0.783 |
| Trained machine learning algorithm alone | 0.797 | 0.830 | 0.798 |
| Combination of image processing algorithm and trained machine learning algorithm | 0.847 | 0.849 | 0.842 |

As shown by the results of the analysis, precision, recall, and the F1 score are all improved using the combination of image processing algorithm analysis and trained machine learning algorithm analysis per the methods and systems described or otherwise envisioned herein.

Accordingly, the methods and systems described or otherwise envisioned herein provide numerous advantages over the prior art. For example, the system provides improved interpretability of ultrasound imaging compared to prior art systems, as a clinician is better able to evaluate the individual features that provide a final lung score. Critically, detecting and visualizing relevant clinical lung features, and providing intermediate results at the frame/video/exam level, allows the user to interpret the ultrasound findings alongside other patient medical information and make a final, more-informed clinical judgment, thereby improving patient outcomes.

According to an embodiment, the methods and systems described or otherwise envisioned herein comprise numerous applications. For example, the system could be utilized in a pre-hospital setting, as an initial evaluation in an emergency room, for follow-up after a treatment, and in many other settings. The method is applicable to all ultrasound imaging systems, especially in point-of-care applications. The methods and systems can be used in a variety of settings including ambulance, ER, or critical care, or surgery situations, including for emergency cases of acute respiratory diseases or thoracic diseases.

Referring to FIG. 2 is a schematic representation of an ultrasound analysis system 200. System 200 may be any of the systems described or otherwise envisioned herein, and may comprise any of the components described or otherwise envisioned herein. It will be understood that FIG. 2 constitutes, in some respects, an abstraction and that the actual organization of the components of the system 200 may be different and more complex than illustrated.

According to an embodiment, system 200 comprises a processor 220 capable of executing instructions stored in memory 230 or storage 260 or otherwise processing data to, for example, perform one or more steps of the method. Processor 220 may be formed of one or multiple modules. Processor 220 may take any suitable form, including but not limited to a microprocessor, microcontroller, multiple microcontrollers, circuitry, field programmable gate array (FPGA), application-specific integrated circuit (ASIC), a single processor, or plural processors.

Memory 230 can take any suitable form, including a non-volatile memory and/or RAM. The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices. The memory can store, among other things, an operating system. The RAM is used by the processor for the temporary storage of data. According to an embodiment, an operating system may contain code which, when executed by the processor, controls operation of one or more components of system 200. It will be apparent that, in embodiments where the processor implements one or more of the functions described herein in hardware, the software described as corresponding to such functionality in other embodiments may be omitted.

User interface 240 may include one or more devices for enabling communication with a user. The user interface can be any device or system that allows information to be conveyed and/or received, and may include a display, a mouse, and/or a keyboard for receiving user commands. In some embodiments, user interface 240 may include a command line interface or graphical user interface that may be presented to a remote terminal via communication interface 250. The user interface may be located with one or more other components of the system, or may be located remote from the system and in communication via a wired and/or wireless communications network.

Communication interface 250 may include one or more devices for enabling communication with other hardware devices. For example, communication interface 250 may include a network interface card (NIC) configured to communicate according to the Ethernet protocol. Additionally, communication interface 250 may implement a TCP/IP stack for communication according to the TCP/IP protocols. Various alternative or additional hardware or configurations for communication interface 250 will be apparent.

Storage 260 may include one or more machine-readable storage media such as read-only memory (ROM), random-access memory (RAM), magnetic disk storage media, optical storage media, flash-memory devices, or similar storage media. In various embodiments, storage 260 may store instructions for execution by processor 220 or data upon which processor 220 may operate. For example, storage 260 may store an operating system 261 for controlling various operations of system 200.

It will be apparent that various information described as stored in storage 260 may be additionally or alternatively stored in memory 230. In this respect, memory 230 may also be considered to constitute a storage device and storage 260 may be considered a memory. Various other arrangements will be apparent. Further, memory 230 and storage 260 may both be considered to be non-transitory machine-readable media. As used herein, the term non-transitory will be understood to exclude transitory signals but to include all forms of storage, including both volatile and non-volatile memories.

While system 200 is shown as including one of each described component, the various components may be duplicated in various embodiments. For example, processor 220 may include multiple microprocessors that are configured to independently execute the methods described herein or are configured to perform steps or subroutines of the methods described herein such that the multiple processors cooperate to achieve the functionality described herein. Further, where one or more components of system 200 is implemented in a cloud computing system, the various hardware components may belong to separate physical systems. For example, processor 220 may include a first processor in a first server and a second processor in a second server. Many other variations and configurations are possible.

According to an embodiment, storage 260 of system 200 may store one or more algorithms, modules, and/or instructions to carry out one or more functions or steps of the methods described or otherwise envisioned herein. For example, the system may comprise, among other instructions or data, ultrasound imaging data 262, image processing algorithm 263, trained machine learning algorithm 264, hybrid model 265, and/or reporting instructions 266, among many other possible instructions and/or data.

According to an embodiment, ultrasound imaging data 262 is any ultrasound imaging data that is sent to, obtained by, or otherwise received by the system. The ultrasound image data may comprise, for example, one or more single frames of ultrasound imaging, or may comprise a temporal sequence of ultrasound image data such as a video comprising a plurality of frames. Ultrasound image data may be obtained for a single region or zone of a patient's lung, or may be obtained for a plurality of different zones for one or more of the patient's lungs. For example, ultrasound image data may be obtained for one, two, or more zones. The ultrasound image data may be received by the system in real-time, or may be stored in local and/or remote memory and received by the system at a future point. The ultrasound image data may be obtained using any ultrasound device or system 270, which may be any device or system suitable to obtain or otherwise receive ultrasound image data of the patient. The ultrasound device or system may be remote to, local to, or a component of, the ultrasound analysis system 200.

According to an embodiment, image processing algorithm 263 is any model or algorithm that is trained or configured to analyze the received ultrasound image data in order to extract one or more image parameters of the selected first lung-related clinical feature. According to an embodiment, the ultrasound analysis system comprises a plurality of different image processing algorithms 263, each configured to recognize and extract parameters for a specific one of the plurality of different possible lung-related clinical features. Alternatively, the system comprises a single image processing algorithm 263 that is adjustable or otherwise modifiable to analyze different clinical features. According to an embodiment, the output of the analysis by the image processing algorithm is a 1×K parameter vector, where K is the number of image parameters used. According to an embodiment, the output of the analysis by the image processing algorithm is a prediction score alone or in combination with the extracted 1×K parameter vector, although other outputs are possible. The prediction score may be a score that is generated by the image processing algorithm that a clinical feature is present or absent, and may be based on the parameters regarding the clinical feature that are extracted by the image processing algorithm.

Once extracted or generated by the image processing algorithm, the parameters, the 1×K parameter vector, and/or prediction score may be utilized immediately or may be stored in local and/or remote memory for future use.

According to an embodiment, trained machine learning algorithm 264 is any model or algorithm that is trained or configured to analyze the received ultrasound image data in order to extract one or more learned parameters of the selected first lung-related clinical feature. According to an embodiment, the trained machine learning algorithm is trained, programmed, configured, or otherwise designed to specifically analyze the selected first lung-related clinical feature, meaning that the trained machine learning algorithm will recognize and extract parameters for the selected first lung-related clinical feature. Thus, according to an embodiment, the ultrasound analysis system comprises a plurality of different trained machine learning algorithms 264, each trained or configured to recognize and extract parameters for a specific one of the plurality of different possible lung-related clinical features. According to an embodiment, the machine learning models be a deep neural network or may be another model such as random forest classifier, support vector machine classifier, boosting classifier, or any other type of machine learning model or algorithm. According to an embodiment, the output of the analysis by the trained machine learning algorithm is a 1×M vector, where M is the number of automatically learned parameters. According to an embodiment, the output of the analysis by the trained machine learning algorithm is a prediction score alone or in combination with the extracted 1×M parameter vector, although other outputs are possible. The prediction score may be a score that is generated by the trained machine learning algorithm that a clinical feature is present or absent, and may be based on the parameters regarding the clinical feature that are extracted by the trained machine learning algorithm. Once extracted or generated by the image processing algorithm, the parameters, the 1×M parameter vector, and/or prediction score may be utilized immediately in downstream steps of the method, or may be stored in local and/or remote memory for future use.

According to an embodiment, hybrid model 265 is any model or algorithm trained or configured to combine the image processing-derived parameters and machine learning-derived parameters about the selected lung-related clinical feature to generate a final lung-related clinical feature analysis. According to an embodiment, the ultrasound analysis system comprises a hybrid model configured to combine the extracted one or more image parameters and the extracted one or more learned parameters of the selected first lung-related clinical feature. The hybrid model may be optimized by combining the image processing and machine learning parameters in one or more of a variety of different ways. Once generated by the hybrid model of the ultrasound analysis system, the generated final lung-related clinical feature analysis, which may comprise a prediction about the presence or absence of the clinical feature among other assessments, may be utilized immediately in downstream steps of the method, or may be stored in local and/or remote memory for future use.

According to an embodiment, reporting instructions 265 direct the system to generate and provide a report or visualization to a user via the user interface 240 of the ultrasound analysis system 200. The report or visualization comprises, for example, any information generated by the system during the analysis, including but not limited to the extracted K features or vector from the image processing algorithm, the M features or vector from the trained machine learning algorithm, and/or the final lung-related clinical feature analysis generated by the hybrid model. Other information is possible as well, including but not limited to the identity of the patient, patient demographics, diagnosis or treatment information, and a wide variety of other possible information. The information can be provided via the user interface using any method for conveying or displaying information, and the user interface can be any device, interface, or mechanism for providing the conveyed or displayed information. Thus, according to an embodiment, in order to facilitate interpretability and transparency, a quantitative or visual display is provided for the user via the user interface.

It will be appreciated that the combination of the image processing algorithm and the trained machine learning algorithm as described herein can also be used to find clinical features in ultrasound images containing anatomies other than the lungs (e.g., cardiac ultrasound imaging, abdominal ultrasound imaging etc.).

The information can be provided via the user interface using any method for conveying or displaying information, and the user interface can be any device, interface, or mechanism for providing the conveyed or displayed information. According to an embodiment, the instructions may direct the system to display the information on the user interface or display of the system. The report may be communicated by wired and/or wireless communication to another device. For example, the system may communicate the report to a mobile phone, computer, laptop, wearable device, and/or any other device configured to allow display and/or other communication of the report.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A method for analyzing ultrasound image data, comprising:
    receiving ultrasound image data for at least a portion of a lung of a patient, the ultrasound image data comprising at least one lung-related clinical feature;
    selecting a first of the at least one lung-related clinical feature;
    analyzing, using an image processing algorithm, the ultrasound image data to extract one or more image parameters of the selected first lung-related clinical feature, wherein the image processing algorithm is defined to analyze the selected first lung-related clinical feature;
    analyzing, using a trained machine learning algorithm, the ultrasound image data to extract one or more learned parameters of the selected first lung-related clinical feature, wherein the trained machine learning algorithm is trained to analyze the selected first lung-related clinical feature;

combining the extracted one or more image parameters and the extracted one or more learned parameters of the selected first lung-related clinical feature to generate a final lung-related clinical feature analysis for the selected first lung-related clinical feature; and providing, via a user interface, the generated final lung-related clinical feature analysis for the selected first lung-related clinical feature.

2. The method of claim 1, wherein combining the extracted one or more image parameters and the extracted one or more learned parameters comprises:

concatenating the extracted one or more image parameters and the extracted one or more learned parameters to generate a concatenated vector; and inputting the concatenated vector into a classifier algorithm, trained on concatenated vectors, to generate the final lung-related clinical feature.

3. The method of claim 1, wherein combining the extracted one or more image parameters and the extracted one or more learned parameters comprises inputting the one or more image parameters into the trained machine learning algorithm to generate the final lung-related clinical feature.

4. The method of claim 1, further comprising:

determining, using the final lung-related clinical feature analysis for the selected first lung-related clinical feature, a clinical assessment for the patient;

wherein the step of providing further comprises providing, via the user interface, the determined clinical assessment for the patient.

5. The method of claim 1, wherein the method is repeated such that:

a second of the at least one lung-related clinical feature is selected;

the selected second lung-related clinical feature is analyzed by the image processing algorithm to extract one or more image parameters of the selected second lung-related clinical feature;

the selected second lung-related clinical feature is analyzed by the trained machine learning algorithm to extract one or more learned parameters of the selected second lung-related clinical feature; and the extracted one or more image parameters and the extracted one or more learned parameters of the selected second lung-related clinical feature are combined to generate a final lung-related clinical feature analysis for the selected second lung-related clinical feature.

6. The method of claim 5, wherein providing via the user interface further comprises providing the generated final lung-related clinical feature analysis for the selected second lung-related clinical feature.

7. The method of claim 5 or 6, further comprising:

determining, using the final lung-related clinical feature analysis for the selected first lung-related clinical feature and the final lung-related clinical feature analysis for the selected second lung-related clinical feature, a clinical assessment for the patient;

wherein the step of providing further comprises providing, via the user interface, the determined clinical assessment for the patient.

8. The method of claim 1, wherein providing via the user interface further comprises providing the extracted one or more image parameters and the extracted one or more learned parameters of the selected first lung-related clinical feature.

9. The method of claim 1, wherein the step of combining comprises combining the extracted one or more image parameters and the extracted one or more learned parameters of each of two or more selected lung-related clinical features to generate a final lung-related clinical feature analysis.

10. An ultrasound analysis system configured to analyze ultrasound image data, comprising:

ultrasound image data for at least a portion of a lung of a patient, the ultrasound image data comprising at least one lung-related clinical feature;

an image processing algorithm defined to analyze a selected first lung-related clinical feature;

a trained machine learning algorithm trained to analyze the selected first lung-related clinical feature;

a processor configured to: select the first of the at least one lung-related clinical feature; analyze, using the image processing algorithm, the ultrasound image data to extract one or more image parameters of the selected first lung-related clinical feature; analyze, using the trained machine learning algorithm, the ultrasound image data to extract one or more learned parameters of the selected first lung-related clinical feature; combine the extracted one or more image parameters and the extracted one or more learned parameters of the selected first lung-related clinical feature to generate a final lung-related clinical feature analysis for the selected first lung-related clinical feature; and a user interface configured to provide the generated final lung-related clinical feature analysis for the selected first lung-related clinical feature.

11. The system of claim 10, wherein the processor is configured to combine the extracted one or more image parameters and the extracted one or more learned parameters by:

concatenating the extracted one or more image parameters and the extracted one or more learned parameters to generate a concatenated vector; and inputting the concatenated vector into a classifier algorithm, trained on concatenated vectors, to generate the final lung-related clinical feature.

12. The system of claim 10, wherein the processor is configured to combine the extracted one or more image parameters and the extracted one or more learned parameters by inputting the one or more image parameters into the trained machine learning algorithm to generate the final lung-related clinical feature.

13. The system of claim 10, wherein:

the processor is further configured to determine, using at least the final lung-related clinical feature analysis for the selected first lung-related clinical feature, a clinical assessment for the patient; and the user interface is further configured to provide the determined clinical assessment for the patient.

14. The system of any of claims 10 to 13, wherein the user interface is further configured to provide the extracted one or more image parameters and the extracted one or more learned parameters of the selected first lung-related clinical feature.

15. The system of claim 10, wherein the processor is further configured such that:

a second of the at least one lung-related clinical feature is selected;

the selected second lung-related clinical feature is analyzed by the image processing algorithm to extract one or more image parameters of the selected second lung-related clinical feature;

the selected second lung-related clinical feature is analyzed by the trained machine learning algorithm to extract one or more learned parameters of the selected second lung-related clinical feature; and the extracted one or more image parameters and the extracted one or more learned parameters of the selected second lung-related clinical feature are combined to generate a final lung-related clinical feature analysis for the selected second lung-related clinical feature.

* * * * *